Patented Oct. 24, 1950

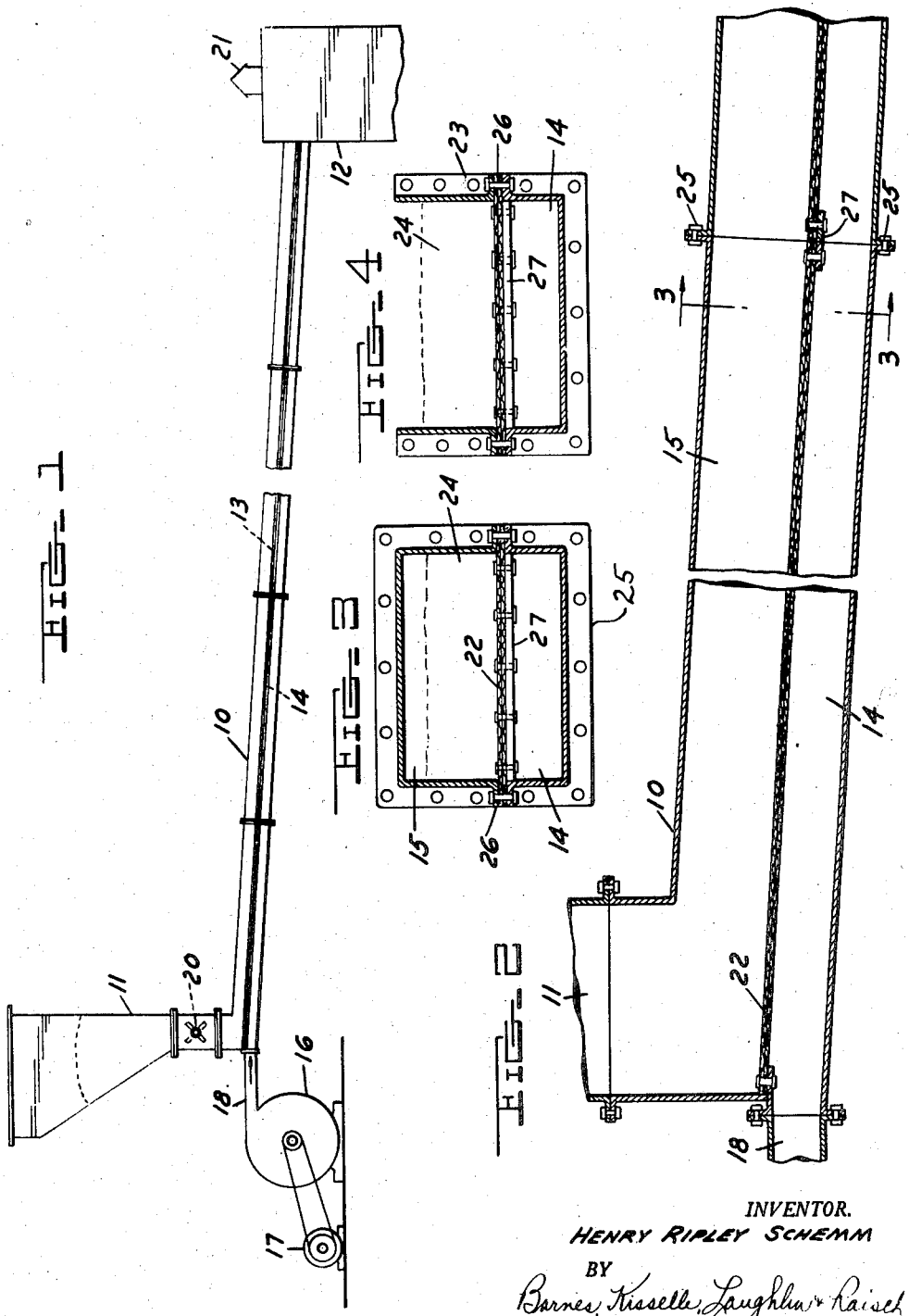
Oct. 24, 1950 — H. R. SCHEMM — 2,527,455
APPARATUS FOR CONVEYING MATERIALS
Filed Feb. 18, 1950 — 2 Sheets-Sheet 1
INVENTOR.
HENRY RIPLEY SCHEMM

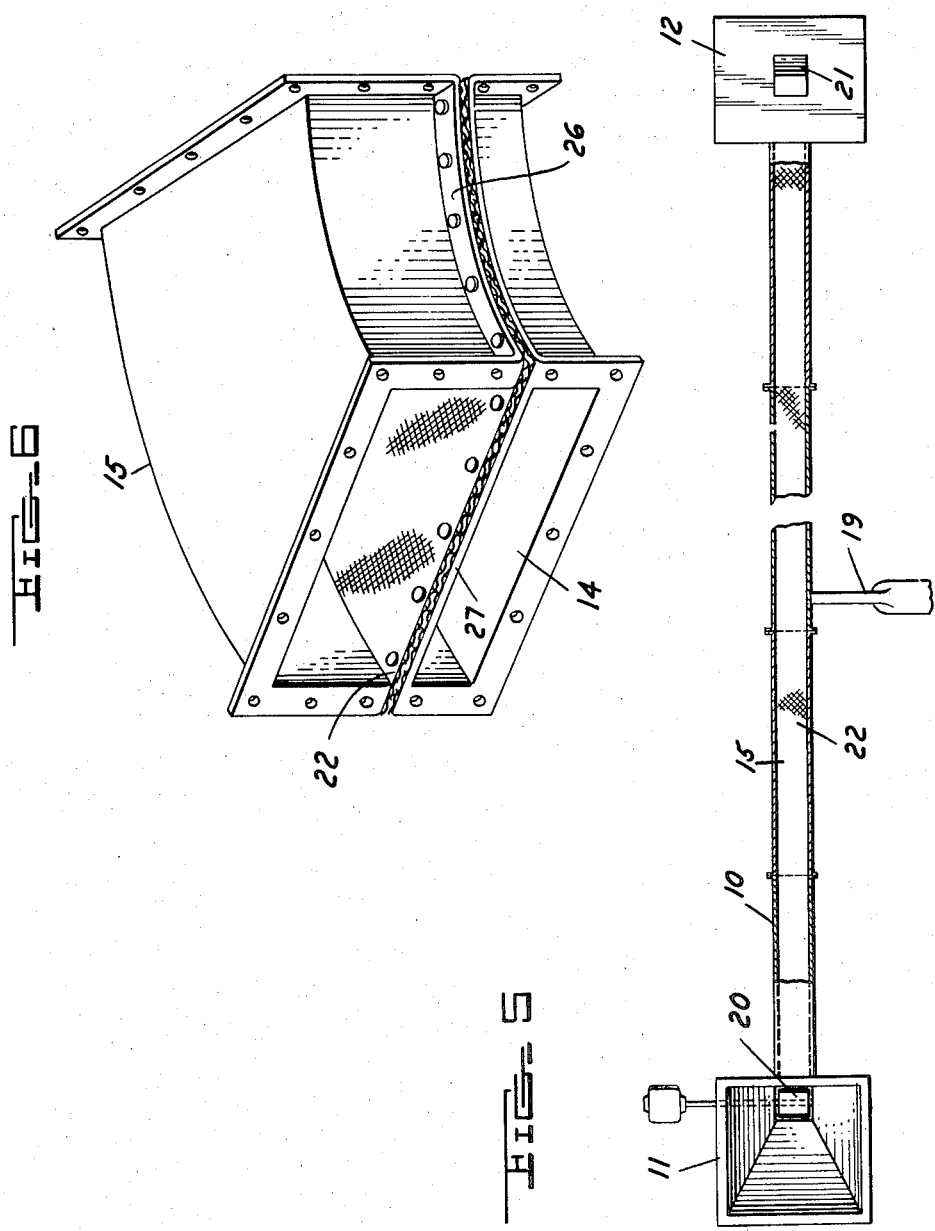

2,527,455

UNITED STATES PATENT OFFICE 2,527,455

APPARATUS FOR CONVEYING MATERIALS

Henry Ripley Schemm, Detroit, Mich., assignor to Huron Portland Cement Company, Detroit, Mich., a corporation of Michigan Application February 18, 1950, Serial No. 144,910

19 Claims. (Cl. 302—53)

This invention relates to an apparatus for conveying fine dry materials in an inclined path, and, more particularly, deals with the conveyance, by gravitational force, of such materials while in a state of fluidity induced by the passage of a gas, such as air, through the material.

It has heretofore been proposed to convey finely divided or pulverulent materials along the surface of a gas-permeable, rigid, porous medium through which air is introduced into the material. The prior proposals and installations have involved a generally horizontally disposed conduit or trough having a material inlet at one end and a material outlet at the other. The suggestion has been made that some inclination of the trough may, depending on the properties of the material, be desirable. The rigid porous medium heretofore used to support the material and cause air to be diffused into it is described as consisting of filter stone or porous brick. Such materials, having low resistance to airflow, are well known and are used extensively, not only for filtration of slurries and aeration of pulps such as sewage, but also in containers for dry pulverulent materials to aerate the dry solid and produce varying degrees of fluidization, particularly in the region of the container outlet.

The importance of proper control of airflow into the conveyed material has been stressed in published descriptions, the preferred method of control being to introduce greater amounts of air, per unit area of the porous medium, near the feed end of the conveyor than are used along the length of the conveyor in the direction of material movement. This type of control of the airflow into the material has been accomplished by several proposed expedients, such as the use of a tapered air chamber under the porous stone, or the use of a series of separate air compartments, each of which is fed by an individual air supply pipe, to attempt to admit progressively decreasing quantities of air into the successive compartments, from the feed end to the discharge end of the conveyor.

Devices of the type described have been used to a limited extent, and while operable to convey material when properly controlled and constructed, have been subject to many operating and maintenance difficulties. In the construction of the conveyor, elaborate installations to control the flow of air to different sections of the air duct have been found necessary to convey at commercially practical rates. If the control is achieved by compartmenting the air chamber below the gas-permeable surface, separate air supply lines to each compartment are required with the attendant valves and dampers or variations in line diameters, thus adding to the cost of installation and the complexity of operation. In those cases where the volume control of the air delivered to different sections of the conveyor is attempted by varying the cross sectional area of the air chamber, there is frequently insufficient latitude in control to permit desired changes in material feed rate or to handle variations in the properties of the material being conveyed. Furthermore, the air must be delivered to the feed end of the conveyor, which in many cases is not the most convenient location for the source of supply.

Further serious disadvantages have been experienced in the starting and stopping of the prior installations. Considerable care has been necessary in starting up an empty conveyor of the prior art to avoid plugging the material conduit when enclosed, or to prevent overflow of material when using an open trough. Perhaps the most serious of the operating difficulties experienced with such prior conveyors has been the residue of material left in the conveyor when the feed is stopped. In such prior practices it has been common to have an uneven bed of material remaining on the porous medium of the conveyor and varying in depth throughout the length of the conveyor from one to several inches in spite of the continued passage of air.

This residue produces two serious difficulties: (1) In a conveyor of commercial size, such a residue constitutes a substantial weight of material and in cases where different materials are handled alternately in the same conveyor, represents an amount of contaminant to the subsequent material which cannot be tolerated. Removal of the trough cover and manual cleaning has frequently been necessary in plant operation after each stoppage. (2) Furthermore, when such uneven but substantial residual beds are present, great difficulties are encountered in starting the conveyor without plugging or overflowing. Similar difficulties are encountered in starting following a stoppage caused by an interruption of the air supply. In short, in the conveyor of the prior art any area of the gas-permeable medium which has a thinner bed of material thereon than the remaining or any other area of the gas-permeable medium, or which may be free of material, usually causes a bypassing of the air through areas covered with a thin bed of material and the areas having thicker beds of material are starved for air and therefore uniform flow of material cannot be obtained.

The permeability of the rigid porous surfaces (of which the known types comprise a series of plates or "filter stones" of ceramically bonded silica grains) changes progressively, but non-uniformly, during operation, as dust particles, condensed water or oil and water vapors, or both, accumulate in the pores of the plates. Further decreases in permeability occur, especially during idle periods of such conveyors handling active materials, such as warm, freshly ground Portland cement, when residual particles on, and in the pores of, the porous surface react with moisture condensing within the pores and conveyor trough and bond to each other and to the mineral particles of the filter stone. This condition prevents the control and maintenance of the permeability of the rigid porous medium through which air is introduced. This non-uniform permeability condition adversely affects or interrupts conveying, since the air supply tends to flow through zones of higher permeability. Under normal dust and humidity conditions, frequent replacement of the plates is required.

These conveyors also require relatively heavy construction and rigid supporting structures to prevent damage to the air seals between adjacent plates and along their side edges and the edges or flanges of the plenum chamber and to prevent breakage of the plates, resulting from sagging or twisting of the conveyor.

The present invention comprehends a simple and efficient apparatus for conveying dry materials of fine particles size which avoids the disadvantages of the prior apparatus described above as well as the additional disadvantages described below in contrasting the flexible, with the rigid, porous medum. With my new apparatus I am able to produce a uniformity of flow and high capacity heretofore unattainable.

In its broad aspect my invention comprises an apparatus for conveying in which a fine dry material is delivered onto a flexible porous or gas-permeable inclined conveying surface having a relatively high resistance to gas flow, and a gas is passed through the surface and into the material to aerate at least a portion of the material closest to the conveying surface, as a result of which the material flows by gravity along the inclined surface. The relatively high resistance to gas flow, conveniently expressed in terms of reduced permeability, results in the equal distribution of an appropriate gas such as air, throughout the length and width of an air duct or plenum chamber positioned below the porous surface, thus assuring the passage of a uniform and controlled volume of air into the material. This low permeability permits a substantial pressure to be developed in the plenum chamber, even in the absence of material to be conveyed on any part of the conveying surface. In the apparatus of the invention the porous member providing the gas-permeable surface has a permeability value not substantially greater than 5, as defined specifically hereinafter. To give maximum results when installed, the conveying surface is inclined at an angle in excess of the angle of repose of the aerated material being conveyed.

My invention contemplates the use of a flexible, porous, gas-permeable material, such as exemplified by a felted fibrous material or a finely or closely woven material, but in its preferred and best form my invention uses a finely or tightly woven material or fabric such as a multi-ply canvas having a relatively high resistance to air passage. Such resistance assures an equal air distribution throughout the plenum chamber and a uniform flow into the material being conveyed, thereby restricting the total volume of air required to the minimum essential to conveying and avoiding any dust nuisance.

In the drawings:

Fig. 1 is a schematic elevation showing my apparatus for conveying material from a hopper to a bin;

Fig. 2 is an enlarged vertical section of the feed end portion of the conveyor of Fig. 1 showing a woven fabric as the gas-permeable medium;

Fig. 3 is a transverse section along the line 3—3 of Fig. 2;

Fig. 4 is a similar section of an alternative form of conveyor having a modified form of material confining means;

Fig. 5 is a top plan view of the conveyor of Fig. 1 having a modified air supply; and Fig. 6 is a perspective view of a curved unit of one form of my conveyor.

As an illustration of a typical conveyor in accordance with my invention I have shown a conveying conduit 10, with the central portion broken away, delivering material from a hopper 11 to a receiver 12. A gas-permeable medium 13 extends from the feed end to the discharge end of the conveyor and provides a material conveying surface which at the same time divides the conveyor into two portions, an air duct or plenum chamber 14 and a material-confining duct or conduit 15. The air is supplied by a fan 16, driven by motor 17, through an appropriate connection 18 to the plenum chamber 14. It is a feature of the invention that the air supply may be provided at any point along the length of the air duct, for example, as shown in Fig. 5 where the air supply connection 19 is made along the side of the conveyor. The material is fed onto the conveying surface near its upper end by feed control mechanism 20 which serves to regulate the amount of material placed in the conveyor in accordance with the desired capacity and the air supply employed. The material discharge end of the conveyor is here shown as connected to a bin 12 which is fitted with a vent 21. This vent serves to release to atmosphere the air which passes through the material being conveyed and flows along the top of the material confining member 15. In certain instances it will be desirable to place an air relief connection at some point along the top of the conveyor.

In the drawings a tightly woven fabric is shown as the gas-permeable medium 22. Fig. 4 illustrates a variation in which the confining walls 23 form an open trough for the conveyance of the material 24.

In practice it is found desirable to manufacture the conveyor in specific lengths, such as 10' lengths. In such a case each section is formed with appropriate flanges 25 to facilitate the assembly of several sections to form a continuous conveyor having a single air duct and an unbroken porous conveying surface. The gas-permeable member 22 is held in place by side flanges 26 kept in a rigid position by appropriately placed bolts, and is stretched lengthwise and bolted to cross support members 27, which are attached to the side walls of the air duct.

Fig. 6 illustrates a special curved section of my conveyor in which a woven canvas 22 is the permeable material. Such curved sections are made possible by the use of woven fabrics having high resistance to gas flow. The material in rounding the curve will often flow in the form of a deeper bed along the outside thereof, and in some cases, if the velocity is sufficiently great, will leave a portion of the canvas on the inside of the curve uncovered. In spite of this unequal distribution of material depth, my conveyor will continue to function with the desired uniformity of flow rate due to the low permeability of the fabric.

In handling dry finely divided materials of suitable particle size ranges it is well known that the introduction of a gas in appropriate quantities into the material by diffusion will result in a marked change in properties, and that the gas-solids mixture will possess many of the properties of a liquid. Individual particles will be separated from each other, the bulk volume considerably expanded, and the internal particle to particle friction reduced to a minimum.

The diffusion of gas into such a material to produce this condition is one of the principal features of the method of conveying contemplated by the present invention. The gas used under normal circumstances is air, but the terms "air" and "aeration," I use in a generic sense to refer to any appropriate gas. In certain special cases it may be desirable to employ an inert gas, a heated or refrigerated gas or mixture of gases, or a gas chemically reactive with respect to the material being conveyed. The use of such gases is within the scope of the term "aeration," which as used herein refers to the introduction of gas into and through the material in volume only sufficient to expand the body of material, without mechanically entraining the particles and removing them from the expanded body of material. Such mechanical entrainment, which in reality is a form of pneumatic conveying, is avoided in the conveyor of the invention since it creates a dust collection problem, wastes power and decreases the efficiency of the conveyor. As described more completely below, it is frequently not necessary, with the present apparatus, to effect complete aeration of the entire bed of material, but only the portion directly above the porous medium.

There are a number of variable factors in the design and operation of the conveyor of my invention which should be considered and properly integrated to permit an operation of maximum efficiency and capacity. The more important of these are:

*Material conveyed.*—Specific gravity, particle size and shape, surface properties, percentage moisture, and angle of repose when aerated;

*Conveyor installation and structure.*—Material feed control means, air venting means, and permissible or necessary slope;

*Flexible gas - permeable medium.*—Structure (i. e. size, shape and distribution of air passages), and resistance to gas flow (gas-permeability);

*Operation of conveyor.*—Airflow (cu. ft. per minute per sq. ft. of effective area), air duct pressure (inches of water), depth of moving bed, and density of moving material (a measure of the degree of aeration), which features have a marked effect on the rate of conveyance of a given material.

Illustrative of the wide variety of materials which may be successfully conveyed in accordance with the invention when in a finely divided, dry state are the following:

Portland cement of various types, mortar and special cements, cement raw materials and mixtures, limestone, dolomite, magnesite, silica, clays including bentonite, barites, gypsum, cryolite, bauxite, phosphate rock and apatite, iron ore, talc, coal, quicklime, hydrated lime, magnesia, alumina, soda ash, sodium phosphates, litharge, anhydrite, ammonium sulphate, fly ash, furnace and kiln flue dusts, bulk resins and plastics, sugar, and farinaceous materials such as bread and cake flours.

The apparatus of the invention is applicable to the conveyance of these materials only if their properties are such as to permit the attainment of a fluent condition when aerated. Perhaps the most important property in this respect is particle shape and size, and particularly the range of particle size. Generally speaking materials should be finer than 20 mesh and preferably finer than about 65 mesh, and at the same time contain a substantial proportion of minus 100 mesh, and with some materials preferably at least 30% by weight of minus 200 mesh, particles. Relatively small amounts of plus 20 mesh particles or agglomerated lumps may be conveyed, provided the remainder has an appropriate size range. As is well known, a material containing particles all of which are substantially the same size is difficult to fluidize or aerate, and in the operation of my apparatus will not be conveyed efficiently. It is desirable for best results to have a substantial spread in size range of the particles. In very fine materials such as pigments, where the particle size is in the low micron range, surface properties become important. Some such materials tend to agglomerate and cannot be made fluent by the introduction of a gas. The specific gravity of the material is not important except as it affects, in combination with the particle size range, the aerated bulk density of the material. The shape of the particle is sometimes important, flat plates or needles, for example, being very difficult if not impossible to aerate effectively.

The permissible moisture is entirely dependent on the particular material, some substances requiring less than 3% moisture for satisfactory fluidization while others will fluidize with moisture contents up to 12%.

Material of a given composition and fineness has a specific angle of repose when unaerated, and I have found that such material when thoroughly aerated has a specific and constant angle of repose substantially less than the aforesaid angle of repose. By "thoroughly aerated" I mean the introduction into the material of a maximum quantity of air permissible without entraining any substantial amount of the fine particles and removing them from the fluidized body of material. The angle may be measured by placing a quantity of material on a horizontal gas-permeable surface and passing air into and through the material. As it becomes aerated, it will spread upon the surface until its profile assumes a specific angle from the horizontal. After this constant angle has been reached, there will be no further movement of the material across the horizontal surface regardless of the time of aeration. The angle of repose of the fully aerated material is thus a measure of the internal particle to particle friction of the material and the frictional resistance of the permeable surface. When tested on gas-permeable surfaces used in my invention, the surface friction effect is small, and the angle of repose may be said to be a measure of the force or "head" required to overcome the particle friction of the aerated material..

When the gas-permeable surface on which the angle of repose is measured is given an inclination equal to the angle of repose of the material, the aerated material will slowly flow down the slope and off the inclined surface leaving a relatively small residue. When the slope is increased above the angle of repose, the velocity of the material flow is increased and a negligible residue is left on the surface. Any increase in the slope above the angle of repose produces a beneficial result. In the method of my invention I therefore prefer to incline the porous conveying surface at least at an angle slightly in excess of the angle of repose of the aerated material to be conveyed and at most at an angle equal to the angle of repose of the unaerated material. In plant practice the slope of my conveyor will be dictated by the headroom available. If such a minimum angle is not utilized material flow can be achieved through a relatively short length of conveyor by providing a head of material at the feed end and by having the side walls of the conveyor sufficiently high to contain the depth of bed necessary to produce such head. The conveyor will not, however, be self-cleaning. A conveyor having a normally desired commercial length and side wall height will not permit a sufficiently deep bed of material near the feed end to product the necessary head required to move the material. I have found that the angles of repose vary from about 2° to as much as 6.5° depending on the material tested or upon the fineness. As an example, ordinary Type I Portland cement has an angle of repose approximating 2.5° whereas the more finely ground high early strength cement will frequently have angles of repose up to 5° depending on the fineness of the sample.

The resistance to the passage of air through a porous medium may conveniently be expressed in terms of air volume passing at a specified pressure drop across the medium or, alternatively, in terms of the pressure drop across the medium at a fixed flow rate of air.

Illustrative of the first-mentioned method of expression is the use of the term "permeability," which represents the capacity of a porous medium to pass air under a given set of conditions and is widely used by the manufacturers of porous stone blocks of the type commonly used in the treatment of sewage by the "activated sludge process." The accepted definition of the term is: "The amount of air measured in cubic feet and at 70° F. and 25% relative humidity which will pass through the area of one square foot of dry porous stone in one minute when tested under an equivalent pressure differential of two inches of water."

It will be understood that the "permeability" of a material is not synonymous with nor directly related to the "porosity" of the material. "Porosity" is defined as the percent ratio of pore space, by volume, to the bulk volume of the material. Thus, the mediums having identical "porosities" may have widely differing "permeabilities" due to variations in the diameter and number of pores. In the fabrication of suitable porous mediums for use in the method of the invention, it is important that a uniform distribution of the air passages through the medium be achieved in order that the introduction of air into the conveyed material will be as uniform as possible.

I have found that porous mediums effective to produce satisfactory conveyance of finely divided materials must have a relatively high resistance to airflow at low pressures. The porous flexible mediums which I employ in accordance with my invention are always gas-permeable and have permeabilities of substantially (i. e. about) 5 as a top limit down to and including zero and determined in accordance with the above first definition (c. f. m./sq. ft. at 2 inches w. g.), but where such permeability is zero, then resistance to airflow is measured by the second method as set forth below. I have found by extensive experimentation that as the permeability increases above about 5, the effectiveness and utility of mediums decrease rapidly, and I have found such mediums, like the high permeability filter stone and porous brick mentioned above, to be unsatisfactory in practical commercial applications. It is to be understood that the definition of the porous medium of the present invention in terms of permeability does not imply that a pressure as low as two inches of water is necessarily used in actual operation.

The second referred to method of defining resistance to airflow is with advantage employed where the specific conditions of measurement involved in the "permeability" definition are not suitable or attainable. Thus, in the case of some woven materials, for example, the application of air under the medium at two inches w. g. pressure may not cause a measurable volume of air to pass through, whereas the application of air at four inches or more may produce a suitable airflow for conveying. Expressed in such terms, the gas-permeable mediums of my invention have a resistance such that with an airflow of 4 c. f. m./sq. ft. through the uncovered medium, i. e. free of the powdered material to be conveyed, a pressure differential of at least 3 inches of water is produced.

A further feature of the invention is the relatively low resistance of the bed of material to airflow compared to that of the porous medium. Successful operation of my air-activated gravity conveyor may thus be said to be dependent on the use of a porous medium having a pressure differential under operating gas volume flow, which is substantial compared to the pressure drop across (i. e. through) the bed of material being conveyed. In the previously described conveyors of the prior art this has not been the case, the pressure drop across the load being high compared to the pressure drop across the porous medium, and as a result, a variation in depth of bed has an immediate and substantial effect on the quantity of air flowing through the porous medium at that point. Conversely, the use of a medium having a low permeability and thus a relatively high resistance to the flow of the desired volume of air, compared to the resistance of the bed of material results in a uniform aeration of the material, and the maintenance of equal pressures through the entire length of the air duct. The effect of differences in bed depth within the range of normal conveying depths, i. e., 2 to 4 inches, on conveyor performance is thus not critical. It is for this reason that in the use of my apparatus an increased depth of material at the feed end of the conveyor does not cause short-circuiting of the air farther along the conveyor with consequent plugging or overflow. Furthermore, when the feed is stopped, the conveyor will empty almost completely because there is no great increase in the amount of air passing the uncovered feed end at the expense of the discharge end which continues to support a flowing bed of material until completion of discharge. Conveyors made in accordance with the invention will empty leaving a residue of only ⅛ inch of aerated material. It will thus be apparent that local temporary changes in depth of material do not cause undesirable results.

The following examples serve to illustrate such pressure differential relationships. A woven cotton fabric having a pressure differential (dP) of 0.9" w. g. when 4 c. f. m./sq. ft. of air is passed therethrough, compares with a measured pressure differential (dP) of 2.6" w. g. across (i. e. through) a bed of Type I Portland cement which is 2 inches deep when unaerated. This represents a dP 2" bed/dP fabric ratio of 2.9. Although this high permeability, flexible woven cotton fabric has important and unexpected advantages over rigid porous stone as set forth below, it has disadvantages with respect to the air distribution and control, with respect to starting and stopping of the conveyor, and with respect to the residue left on the conveyor when the feed is stopped—all similar to those listed above with respect to rigid porous stone of the prior art. In contrast, a multi-ply woven cotton fabric having a relatively high resistance to flow of air and of the type found most satisfactory in commercial installations, gave the following results when tested in the same manner. With an air passage of 4 c. f. m./sq. ft., the pressure drop across the fabric or canvas was 5.1" w. g., and the dP across a two inch bed of the same cement was 2.4" w. g. This represents a bed to fabric dP ratio of 0.47. Ratios for other fine or pulverulent materials show a similar relationship. Using a fabric or canvas having a dP of 4.1" at 4 c. f. m./sq. ft. air passage, a two inch bed of ground barites showed a dP of 2.8", while a 2" bed of bentonite gave a value for dP of 1.5". These represent material (bed) to diffuser (fabric) dP ratios of 0.68 and 0.37 respectively.

In another actual embodiment of my invention for conveying Portland cement the fan delivered 4.4 c. f. m./sq. ft. of canvas at a pressure of one pound or 27.7 inches w. g. (see my copending application Serial No. 717,913, filed December 23, 1946). Based on numerous tests of this type and on actual installations of the porous mediums tested in conveyors, I can say that in accordance with my invention a preferred flexible, gaspermeable medium is one which, when 4 c. f. m./sq. ft. of gas are passed therethrough, has a pressure differential or drop greater than is obtained with the same quantity of air passing through a bed of material two inches deep (measured when unaerated) and while supported by the porous medium, i. e., the dP 2" bed/dP of fabric should be less than 1. From this it will be apparent that in my conveyor it is the porous medium itself which is the major factor in the airflow control, whereas in the previous conveyors of this type, the material bed is the major determining factor in the control of the airflow through the porous surface, and the supply of the air to various sections of the lower side of the porous member must be regulated accordingly.

In plant operation with a covered conveyor a practical material bed depth is from 2 to 4 inches and with such a depth of bed of material the volume of air required for efficient conveyance is in most cases from 3 to 5 c. f. m./sq. ft. of surface of porous medium and at plenum chamber pressures of from 4 to 12 inches w. g., but with some materials even substantially higher pressures are required. When uncovered conveyors are used with deeper beds of material, then plenum chamber pressures from 12 to 20 inches w. g. are used and in some instances with substantially increased depth of bed pressures up to 40 inches w. g. are necessary.

In carrying out my invention I prefer, as previously stated, to employ a tightly woven flexible material having a relatively high resistance to flow of air as the porous medium for introducing gas into the material being conveyed. The use of such a material, for example, a cotton canvas commonly designated by the manufacturer as a multi-ply canvas and having a relatively low permeability, i. e. below about 5 and with particular advantage below about 2, gives rise to many important and unexpected advantages as compared to a medium such as a porous stone made from bonded mineral particles. These substantial improvements are experienced in the manufacture of the conveyor, in the installation of the conveying system, in the operation of the conveyor, and during an increased conveyor operating life in the course of which conveying capacities are increased and operating problems minimized.

In manufacturing a conveyor in which canvas is used the entire assembly can, if relatively short, be completed ready for use, or for convenience in shipping and handling, can be fabricated in completed standardized 10 to 20 ft. long sections, which are later joined by simple gaskets. The canvas is stretched over the plenum chamber and sealed in place by a simple mechanical closure. In the case of stones, which are normally twelve inches long, installation and sealing against air leakage with a cementing compound between each two stones and between the stones and the plenum chamber is required. If this is not done during installation of the conveying system, torsional stresses, jarring during shipping, handling and installation will usually break the seals in numerous places, or break the stone. Sealing of the stones is a difficult mechanical operation, and is aggravated by the tendency of the stones to absorb water from the grouting material, and by the danger of spillage of such cementing materials onto the stone surface. Resealing along the edges is difficult and unsatisfactory. Non-breakability of my flexible porous medium itself is a further important advantage. A tool dropped on canvas bounces off whereas the stone will be broken, necessitating a long shut-down time while the stone section is replaced and resealed.

In a plant installation, the lightness of the canvas permits the supporting of the conveyor by overhead cables, straps or brackets, or by the use of a light framework from below whereas a stone conveyor requires heavy rigid supports. A fabric conveyor can in fact be suspended freely and a limited amount of sagging or torsional movement will cause no difficulties. With stone conveyors, no such simple installation is possible.

The regularity of weave, and thus the permeability of the canvas, can be carefully controlled by proper loom operation. In the case of stones, variations will occur from stone to stone, and even within a single stone. Aeration and uniformity of flow of fine materials is very sensitive to such variations.

A major operating difficulty encountered in the use of porous stones is the tendency for the pores to become plugged, thus stopping or seriously retarding the conveying action. Air supplied to the air duct by normal plant sources will frequently contain oil, moisture, or dust. These substances enter the pores of the stone from below and quickly reduce the ability of the stone to pass air. Furthermore, the average fine material being conveyed, particularly a rock product type of material, will have a strong tendency to enter the pores of the stone from above in an irregular manner and further aggravate the plugging of the porous medium. It is a very difficult operation, and in some instances impossible, to clean such stones and restore them to their original permeability, wire brushing or acid bath treatment being necessary to accomplish proper cleaning. Such procedures make cleaning impractical in a normal plant installation and it is frequently preferable to replace the stones by new ones at regular intervals in order to maintain a constant conveying capacity.

In cases where the material being conveyed has hydraulic properties, such as in the case of Portland cement, moisture will sometimes react with the material in the pores of the conveyor and further complicate the problem of plugging the pores. This condition is aggravated when even a small amount of material is allowed to stand in the conveyor during shut-down periods. Deposits of such hydraulic materials in the pores of stones are impossible to remove inasmuch as the chemical cementing bond is not only accomplished between material particles but also directly with the stone particles in the porous medium, in effect resulting in a single concreted structure. Under like conditions the particles of hydraulic material will bond to each other but will not bond to the fibers of a woven fabric or canvas.

By the use of a woven fabric, plugging of the pore spaces is avoided due to the flexibility of the fabric and its tendency to breathe (i. e., flex upwardly and downwardly) during slight changes in air flow. In practice I have found that the permeability of a canvas conveying surface remains substantially constant over long periods of time and thus the permeability of the porous medium can be controlled by initially selecting a woven fabric having the desired permeability. The use of dusty or moist air and a variety of materials, including Portland cement, over the conveying surface does not cause any marked change in the resistance to airflow, thus obviating the necessity for elaborate air cleaning operations. In one instance where a conveyor contained a residue of Portland cement, and the operator left the conveying surface uncovered, a rain storm caused a hard surface of concrete to be formed on the surface of the conveyor. This was chopped loose by chisels and scraped off the canvas by hand following which, cement was introduced at the feed end and it was conveyed through the conveyor at a normal rate. Any such mishap in the case of a stone conveyor would have caused the concrete formed to be chemically bonded to the stone particles by reaction and any attempt to remove it would have caused the destruction of the porous medium.

An additional advantage of a canvas over many types of porous stone resides in the fact that hot materials up to about 300° F. may readily be handled on the canvas, whereas in the average stone conveyor, temperature differentials in the conveyor will cause a cracking of the usual sealing compounds and consequent leakage of air. The preparation of a stone conveyor for the handling of high temperature materials requires specially made porous mediums and special cementing and closure means which in certain cases are warranted because the temperatures are above those which can effectively be handled on a fabric.

The use of a woven material is an advantage in the fabrication of curved sections as will be appreciated from the illustration in Fig. 6. It is necessary only to cut the fabric to the desired curvature. Such a structure is not practical with a stone conveyor and the turning of a corner can be accomplished only by discharging the material to a lower placed conveyor leading in another direction. This entails a loss of head room which is frequently not available. In supporting porous stones it is usually necessary to install supporting cross strips under each stone junction in order to assure effective seals between the stones. In a fabric conveyor cross supports are required only at the ends of each section.

In conveying materials having special properties, or under special conditions, it is sometimes necessary to employ a permeable member which is chemically non-reactive to the material or aerating gas. Thus, fabrics can be impregnated with non-reactive coating compounds, and, due to their flexibility, not have their permeability impaired. This is not possible with porous stones.

A further difference of importance between a woven fabric and a porous stone is the airflow pattern. In a canvas of low permeability, for example, the air passage is substantially vertical through the mesh of the fabric in a multiplicity of fine, uniformly spaced jets. With the porous stone type of gas-permeable medium, on the other hand, a more evenly diffused delivery is obtained. This is caused by the random arrangement of the mineral particles at the surface of the stone which produces fine exit streams of random direction. This difference can be clearly observed in the case where a thin bed of material, ⅛ inch, is placed on each type of aeration medium. With the fabric, fine, regularly spaced air jets are evident and are arranged in a pattern corresponding to the weave. Increasing the airflow merely accentuates the pattern up to the point where entrainment of material occurs. In contrast, because of the random distribution of the direction of flow from the surface of the stone, no such air pattern is visible when the same thin bed is placed on it. With increased air over that required to produce fluidization, widely spaced geysers and craters of considerable diameter usually result, probably due to local variations in the permeability of the stone. It is my belief that what may be termed the fine vertical jets obtained with a fabric of low permeability have a higher velocity and because of the resulting turbulence, are more effective in producing maximum fluidization in the material adjacent the conveying surface, and when operating with sufficient air to thoroughly aerate the entire bed, the efficiency of such fluidization is improved by the use of an appropriate fabric. Increasing the degree of aeration causes an increased material flow velocity and a correspondingly thinner bed and permits an increased feed rate, thus increasing the conveying capacity for a given size conveyor.

An additional point of interest in connection with the "jet action" of the canvas is that with many materials, it causes a lowering of the pressure drop across a two inch bed of material compared to a stone of comparable permeability and particularly compared to a stone of high permeability. This may be attributed to the higher individual jet velocity. Any such decrease in the pressure differential across the material bed compared to the drop across the porous medium, as previously described, is desirable to insure equal air distribution through the plenum chamber.

It is desirable in most instances to control and limit the rate of feed into the conveyor by a conventional feeder 20 so that it will not exceed the rate of free flow by gravity of the material through the conveyor. When using minimum quantities of air to cause material movement in a conveyor of the type shown in Fig. 3, the introduction of excessive quantities of material may tend to plug the conveyor by forcing material against the top of the duct. This condition may usually be overcome or prevented by the use of somewhat increased quantities of aeration gas.

This application is a continuation-in-part of my copending applications Serial No. 602,004, filed June 28, 1945, now abandoned, Serial No. 717,913, filed December 23, 1946, and Serial No. 51,224, filed September 25, 1948.

I claim:

1. An apparatus for conveying a finely divided substantially dry material comprising a conduit having an inlet and an outlet for said material and having a flexible, gas-permeable porous wall positioned between the top and bottom of said conduit and serving as a support for said material and upon which said material flows when aerated, said porous wall dividing the conduit into an upper portion for the material to be conveyed and a lower portion forming a plenum chamber, said porous wall being inclined downwardly throughout its length from said inlet to said outlet at an angle at least equal to the angle of repose of said material being conveyed when aerated, said flexible porous wall having a permeability not substantially exceeding 5, and means for forcing a gas into said plenum chamber and through said porous wall at a substantially uniform pressure and rate throughout the length of said porous wall, whereby said finely divided material upon said porous wall is aerated and flows downwardly upon said porous wall by gravity.

2. The apparatus as defined in claim 1 wherein the flexible, gas-permeable porous wall is of fibrous material.

3. The apparatus defined in claim 1 wherein the flexible, gas-permeable porous wall is a closely woven fabric.

4. The apparatus defined in claim 3 wherein the fabric is canvas.

5. An apparatus for conveying a finely divided material comprising a conduit having an inlet and an outlet for said material, a second conduit below said first conduit and co-extensive therewith, a flexible, gas-permeable porous support constituting a common wall between and throughout the length of said conduits, said flexible porous wall being the ceiling of the second conduit and the floor of the first conduit, said flexible porous wall being inclined downwardly from said inlet to said outlet at an angle at least equal to the angle of repose of the said material being conveyed when aerated, said flexible porous wall having a permeability not substantially exceeding 5, and where the permeability of such flexible porous wall is zero, then said flexible porous wall having a resistance to gas flow therethrough such that with a gas flow of substantially 4 c. f. m./sq. ft. through the uncovered wall a pressure differential of at least 3 inches of water is produced, and means for introducing a gas at low pressure into said second conduit and through said porous wall at a substantially uniform pressure and rate throughout the length of said porous wall whereby said finely divided material upon said porous wall is aerated and flows downwardly upon said porous wall by gravity.

6. The apparatus set forth in claim 5 including means for feeding said finely divided material into said first conduit upon said porous wall at a controlled rate coordinated with the rate of flow of the aerated material along said porous wall so that the rate of flow of the aerated material along the porous wall is at least as great as the rate of feeding into the first conduit.

7. The apparatus defined in claim 6 wherein the porous wall is a closely woven fabric material.

8. An apparatus for conveying a finely divided substantially dry material comprising a conduit having an inlet and an outlet for said material and having a flexible, gas-permeable porous wall positioned between the top and bottom of said conduit and serving as a support for said material and upon which said material flows when aerated, said porous wall dividing the conduit into an upper portion for said material to be conveyed and a lower portion forming a plenum chamber, said porous wall being inclined downwardly throughout its length from said inlet to said outlet at an angle at least equal to the angle of repose of the said material being conveyed when aerated, said flexible porous wall having a permeability not substantially exceeding 5 and such that the pressure required to pass 4 c. f. m./sq. ft. of gas through the porous wall is greater than the pressure required to pass 4 c. f. m./sq. ft. of gas through a substantially two inch bed of said material measured while said material is unaerated and while supported by said porous wall, and means for forcing a gas into said gas conduit and through said porous wall at a substantially uniform pressure and rate throughout the length of said porous wall, whereby said finely divided material upon said porous wall is aerated and flows downwardly along said porous wall by gravity.

9. The apparatus defined in claim 8 wherein the porous wall is of multi-ply canvas material.

10. Apparatus for conveying finely divided dry material comprising a flexible, gas-permeable member having a material conveying surface, a plenum chamber at the side of the gas-permeable member opposite the material conveying surface, said gas-permeable member forming at least a part of a wall of said plenum chamber, and means for introducing a gas into the plenum chamber to pass through the gas-permeable member and into the material thereon, said flexible, gas-permeable member having a permeability not substantially exceeding 5, and where the permeability of such flexible, gas-permeable member is zero, then said member having a resistance to gas flow therethrough such that with a gas flow of substantially 4 c. f. m./sq. ft. through the uncovered member a pressure differential of at least 3 inches of water is produced, and said apparatus being adapted to be mounted with the material conveying surface in a slightly inclined position.

11. Apparatus for conveying finely divided dry material comprising a flexible, gas-permeable member having a material conveying surface, a plenum chamber at the side of the gas-permeable member opposite the material conveying surface, said gas-permeable member forming at least a part of a wall of said plenum chamber, means for introducing a gas into the plenum chamber to pass through the gas-permeable member and into the material thereon, and material confining walls extending lengthwise of the conveying surface along the outer edges thereof, said flexible, gas-permeable member having a permeability not substantially exceeding 5, and where the permeability of such flexible, gas-permeable member is zero, then said member having a resistance to gas flow therethrough such that with a gas flow of substantially 4 c. f. m./sq. ft. through the uncovered member a pressure differential of at least 3 inches of water is produced, and said apparatus being adapted to be mounted with the material conveying surface in a slightly inclined position.

12. Apparatus for conveying finely divided dry material comprising a flexible, gas-permeable member having a material conveying surface, a plenum chamber at the side of the gas-permeable member opposite the material conveying surface, said gas-permeable member forming at least a part of the side wall of said plenum chamber, means for introducing a gas into the plenum chamber to pass through the gas-permeable member and into the material thereon, an inverted trough positioned above the conveying surface to confine the material to said surface, said flexible, gas-permeable member having a permeability not substantially exceeding 5, and where the permeability of such flexible, gas-permeable member is zero, then said member having a resistance to gas flow therethrough such that with a gas flow of substantially 4 c. f. m./sq. ft. through the uncovered member a pressure differential of at least 3 inches of water is produced, and said apparatus being adapted to be mounted with the material conveying surface in a slightly inclined position.

13. A system for conveying finely divided dry material which comprises, a gas-permeable, flexible member having an upper material conveying surface, a plenum chamber positioned below the gas-permeable member and coextensive with the conveying surface, forming at least part of the upper wall of the plenum chamber and said gas-permeable member being mounted in a slightly inclined position and having a permeability not substantially exceeding 5, and where the permeability of such flexible, gas-permeable member is zero, then said member having a resistance to gas flow therethrough such that with a gas flow of substantially 4 c. f. m./sq. ft. through the uncovered member a pressure differential of at least 3 inches of water is produced, means for delivering material onto the upper end of the permeable member, means for receiving material discharged from the lower end of the permeable member, a source of gas under pressure, and means for passing gas from said source to the plenum chamber.

14. A system for conveying finely divided dry material which comprises an elongated tightly woven material having an upper material conveying surface, a plenum chamber positioned below the woven material and coextensive with the conveying surface, said woven material forming at least a part of the upper wall of the plenum chamber and being mounted in a slightly inclined position and having a permeability not substantially exceeding 5, and where the permeability of such woven material is zero, then said woven material having a resistance to gas flow therethrough such that with a gas flow of substantially 4 c. f. m./sq. ft. through the uncovered woven material a pressure differential of at least 3 inches of water is produced, means for delivering material onto the upper end of the conveying surface, means for receiving material discharged from the lower end of the woven material, a source of gas under pressure, and means for passing gas from said source to the plenum chamber.

15. Apparatus for conveying finely-divided material comprising an elongated, flexible, gas-permeable member having a gas-permeability not substantially exceeding 5 and having a material-conveying surface, a plenum chamber at the side of the gas-permeable member opposite the material-conveying surface thereof into which a gas may be introduced to pass through the gas-permeable member and into material thereon to aerate such material, said apparatus being adapted to be mounted with the material-conveying surface in a slightly inclined position.

16. The apparatus defined in claim 15 wherein the gas-permeable member has a permeability not substantially exceeding 2.

17. The apparatus defined in claim 15 wherein the gas-permeable member is of fibrous material.

18. The apparatus defined in claim 15 wherein the gas-permeable member is closely woven fabric.

19. The apparatus defined in claim 15 wherein the gas-permeable member is canvas.

HENRY RIPLEY SCHEMM.

REFERENCES CITED

The following references are of record in the file of this patent:

UNITED STATES PATENTS

| Number | Name | Date |
| --- | --- | --- |
| 679,248 | Wood | July 23, 1901 |
| 1,068,163 | Payne | July 22, 1913 |
| 1,253,935 | Callon | Jan. 15, 1918 |
| 1,971,853 | Ihlefeldt | Aug. 28, 1934 |
| 2,219,283 | Horn | Oct. 29, 1940 |
| 2,316,814 | Schemm | Apr. 20, 1943 |

FOREIGN PATENTS

| Number | Country | Date |
| --- | --- | --- |
| 696,214 | Germany | Sept. 14, 1940 |

Certificate of Correction

Patent No. 2,527,455                                         October 24, 1950

HENRY RIPLEY SCHEMM

It is hereby certified that error appears in the printed specification of the above numbered patent requiring correction as follows:

Column 15, lines 36 and 37, strike out the words "forming at least part of the upper wall of the plenum chamber and" and insert the same in line 38, after "member";

and that the said Letters Patent should be read as corrected above, so that the same may conform to the record of the case in the Patent Office.

Signed and sealed this 2nd day of January, A. D. 1951.

[SEAL]

THOMAS F. MURPHY,
                                                     *Assistant Commissioner of Patents.*